United States Patent
Meehan et al.

(10) Patent No.: US 7,180,732 B2
(45) Date of Patent: Feb. 20, 2007

(54) MOUNTING APPARATUS FOR STORAGE DEVICES

(75) Inventors: Thomas F. Meehan, Los Altos, CA (US); Raymond A. Bahar, San Jose, CA (US); Rajendra Bhadra, San Jose, CA (US); Patrick Weiher, Los Altos, CA (US)

(73) Assignee: Disk Dynamix, San Jose, CA (US)

( * ) Notice: Subject to any disclaimer, the term of this patent is extended or adjusted under 35 U.S.C. 154(b) by 467 days.

(21) Appl. No.: 10/702,837

(22) Filed: Nov. 5, 2003

(65) Prior Publication Data

US 2004/0177219 A1    Sep. 9, 2004

Related U.S. Application Data

(60) Provisional application No. 60/424,130, filed on Nov. 6, 2002, provisional application No. 60/424,348, filed on Nov. 6, 2002.

(51) Int. Cl.
*G06F 1/16* (2006.01)

(52) U.S. Cl. .................................... 361/685; 711/114

(58) Field of Classification Search ................ 361/685, 361/724–727; 711/114
See application file for complete search history.

(56) References Cited

U.S. PATENT DOCUMENTS

| 4,941,841 | A | * | 7/1990 | Darden et al. | ............. | 361/685 |
| RE34,369 | E | * | 9/1993 | Darden et al. | ............. | 439/377 |
| 5,938,744 | A | * | 8/1999 | Roganti et al. | ............. | 710/25 |
| 6,188,571 | B1 | * | 2/2001 | Roganti et al. | ............. | 361/685 |
| 6,292,360 | B1 | * | 9/2001 | Carteau | ............. | 361/685 |
| 6,724,619 | B2 | * | 4/2004 | Kwong et al. | ............. | 361/685 |

* cited by examiner

*Primary Examiner*—Lisa Lea-Edmonds
(74) *Attorney, Agent, or Firm*—Irell & Manella LLP

(57) ABSTRACT

A method and apparatus for mechanically mounting and electrically connecting a plurality of small form factor (SFF) storage devices such as 2.5" hard disk drives in place of a larger SFF hard disk drive such as a single SFF 3.5" hard disk drive. This provides increased disk drive capacity and/or higher performance. The storage devices may be connected in a redundant array of independent disk (RAID) architecture for implementation as a RAID stripe, mirror, or other RAID configuration.

19 Claims, 4 Drawing Sheets

MOUNTING APPARATUS FOR STORAGE DEVICES

CROSS-REFERENCES TO RELATED APPLICATIONS

This non-provisional application claims priority from provisional patent application Ser. Nos. 60/424,130 and 60/424,348, filed Nov. 6, 2002, the contents of which are incorporated herein by reference. This non-provisional application is being filed concurrently with U.S. patent application Ser. No. 10/732,835, entitled "MULTIPLE LEVEL RAID ARCHITECTURE," the contents of which are incorporated herein by reference.

BACKGROUND OF THE INVENTION

1. Field of the Invention

The invention relates generally to storage devices, and specifically, to an apparatus and method for mounting a plurality of small form factor (SFF) storage devices in place of a larger SFF hard disk drive.

2. Background Information

Over the past two decades, storage device capacities have steadily increased, while at the same time the physical size of the devices has decreased. As capacities of storage devices increase, including 3.5" hard disk drives, the performance of multi-drive systems can suffer due to the increase in access time required to retrieve the same amount of data from the hard drives. This is due to the fact that most multi-drive systems incorporate a RAID striping algorithm that evenly distributes the data to the storage devices. Evenly distributing the same amount of data to fewer drives decreases the overall system performance.

DETAILED DESCRIPTION

Disclosed herein are a method and apparatus for mechanically mounting a plurality of smaller form factor storage devices such as 2.5" hard disk drives in place of a larger SFF hard disk drive, such as a 3.5" hard disk drive, for electrically connecting the hard drives in a computer or data storage system.

In one embodiment, this configuration is used in a redundant array of independent disk (RAID) architecture, though the configuration may be used in other applications. This configuration allows for the host processor to detect, for example, one large hard drive, mirrored pairs of storage devices, or other RAID configuration. For instance, in a RAID 0 application, the system will attempt to evenly spread out the data written and retrieved from the storage devices in the system. This will allow for no one storage device to contain all the data being written or retrieved, which allows for higher performance system.

Adding a larger quantity of smaller drives to the system can return the system performance lost through higher capacity drives. Additionally, adding more drives facilitates making copies or mirrors of all or part of the file system much easier. In fact, any redundant array of independent disk (RAID) type architecture or algorithm could be used, which could increase the performance and/or reliability of the user's data.

Figure 1:
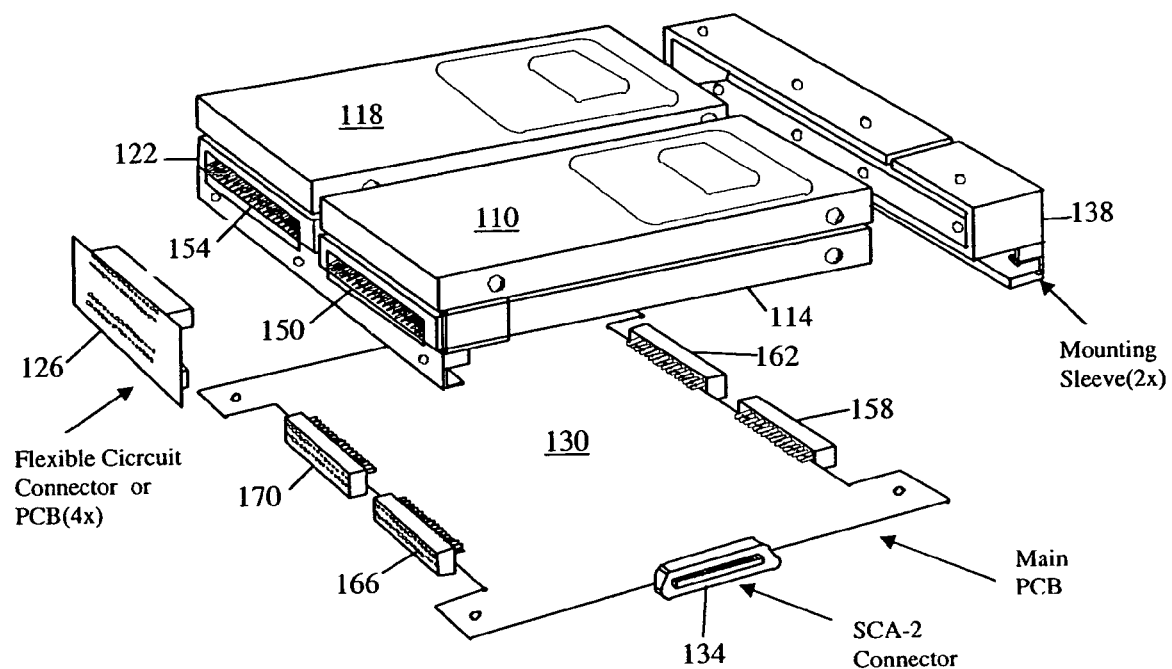
FIG. 1 illustrates a perspective view of an exemplary apparatus in which four 2.5" hard disk drives are mounted in place of a single 3.5" hard disk drive.

FIG. 1 illustrates a perspective view of an exemplary apparatus in which four 2.5" hard disk drives are mounted in place of a single 3.5" hard disk drive. Referring to FIG. 1, two hard disk drives 110 and 118 are mounted with their interface connectors (not shown) facing one direction, and two hard disk drives 114 and 122 are mounted with their interface connectors, 150 and 154, respectively, facing the opposite direction. Also shown in FIG. 1 is a printed circuit board (PCB) 130 having female interface connectors 158, 162, 166, and 170. A flexible circuit or rigid PCB 126 is used to electrically connect the pins of the interface connector 154 on the hard disk drive 122 to the interface connector 170 of the PCB 130. Three similar flexible circuits or rigid PCBs 126 are used to electrically connect the other hard disk drives 110, 114, and 118 to the PCB 130. It is to be appreciated that in another embodiment, the PCB 126 may be replaced with a connector that mates, at one end, with the interface connector of the hard disk, and is soldered, at the other end, to the PCB 130. In yet another embodiment, the flexible circuit connector or PCB 126 may be integrated as part of the PCB 130.

The PCB 130 transmits data to and receives data from a host interface via a connector 134. In this exemplary embodiment, the connector 134 is an SCA-2 connector. It is to be appreciated that other connectors may be used such as, for example, an ATA connector, SCSI connector, etc. The host interface may be ATA, SCSI, FC, SATA, SAS, PCI or any other defined system level interface. With the flexibility of any disk level interface possible, this device could replace a 3.5" SFF hard drive in, for example, a personal computer, network storage sub-system, database transaction server, consumer electronics product, computer aided design server, or any data storage system.

The hard drives and the PCB 130 are mounted to two mounting sleeves, one of which is labeled as 138. The mounting sleeves can be made using a metal stamping, casting, or other material. The mounting sleeves include the standard 3.5" disk drive mounting holes that allow for mounting in a standard 3.5" disk drive form factor. Other mechanical mounting techniques are possible. For instance, stand-offs from the PCB 130 could be incorporated. A metal framework mounted from the PCB 130, containing all the necessary mounting holes for the drives and PCB 130 could be configured. Vertical instead of horizontal mounting sleeves may be also used. The mounting sleeves illustrated in FIG. 1 and FIG. 2 and component 138 provide one example of a reliable and simple mounting technique.

Figure 2:
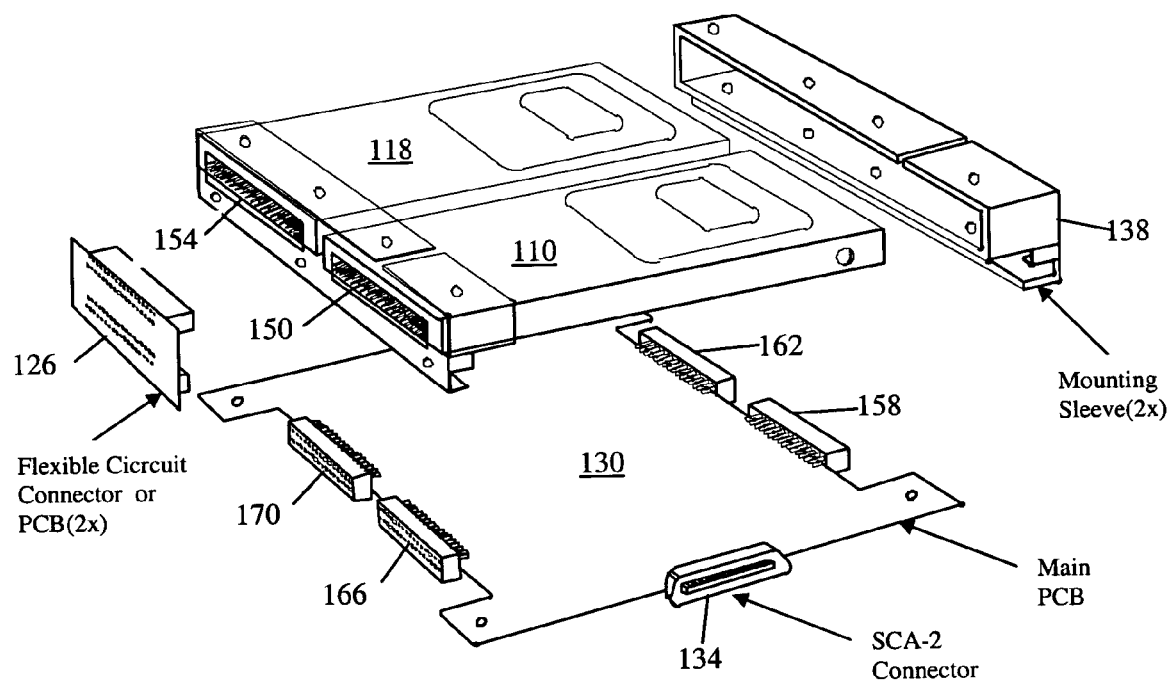
FIG. 2 illustrates a perspective view of another exemplary apparatus in which two 2.5" hard disk drives are mounted in place of a single 3.5" hard drive.

FIG. 2 illustrates a perspective view of another exemplary apparatus in which two 2.5" hard disk drives are mounted in place of a single 3.5" hard drive. In this embodiment, only two hard disk drives 110 and 118 are mechanically mounted and electrically connected to the PCB 130. It should be appreciated that, in another embodiment, three 2.5" hard disk drives can be mounted in place of a single 3.5" hard disk drive. As can be seen from the drawing, the same PCB 130 and mounting sleeves can be used whether two, three, four, or as many hard drives as can fit are mounted in place of a 3.5" hard disk drive.

The Small Form Factor committee allows for the following 3.5" hard disk drive dimensions:
Length: 5.787
Width: 4.000
Height: 1.028

Mounting up to four 2.5" hard drives 110, 114, 118, and 122 with the PCB 130 is possible in the above allowable dimensions. In can be appreciated that with smaller dimension 2.5" drives or other SFF form factor hard drives, more drives can be used in place of the original 3.5" hard drives. Older 1.6" height 3.5" hard drives can also be replaced with alternate form factor drives using the same method.

Figure 3:
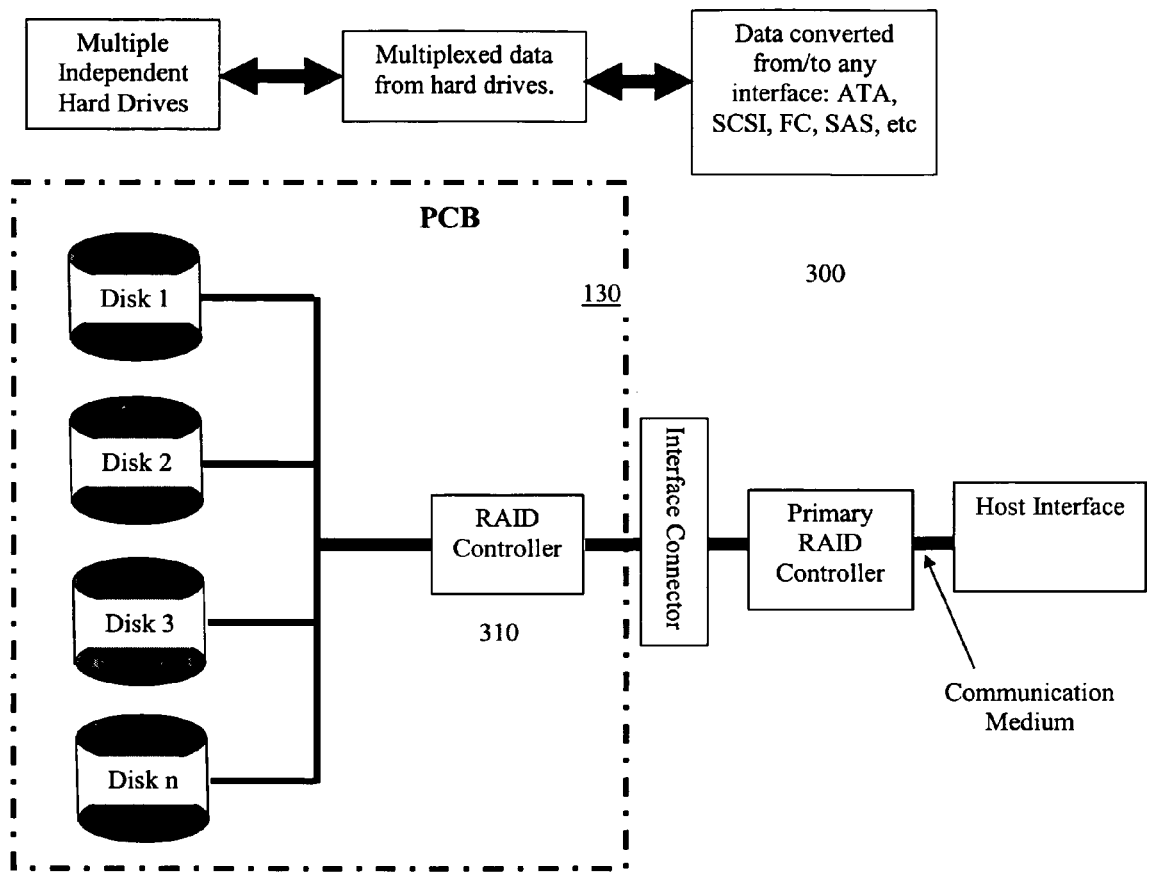
FIG. 3 illustrates an exemplary logical arrangement of the apparatus of FIG. 1.

FIG. 3 illustrates an exemplary logical arrangement of the apparatus 300 of FIG. 1. Referring to FIG. 3, "n" (e.g., 4) storage disks (e.g., hard drives) are coupled to a RAID controller 310, which, in this embodiment, is located on the PCB 130. The RAID controller 310 is coupled to a host via a communication medium, where communication medium may include, but is not limited to, a cable, PCB, or other connection between the 2 controllers. In one exemplary implementation, the apparatus 300 is installed in a computer system (not shown) where the host sees the apparatus as a single logical unit where the apparatus can be configured in any RAID configuration (e.g., stripe, mirror, etc.). In another implementation, the RAID controller 310 may be coupled to a primary RAID controller [(not shown)] that sits before the host interface. For instance, this primary RAID controller may be located on a "plug-in" card or mounted directly on a motherboard of the computer system. While the embodiments disclosed herein describe and show hard disk drives as the storage devices, it should be noted that any type of storage device may be used such as rigid disk drives, removal media drives, optical drives, solid state storage, etc.

Several embodiments are possible for electrically connecting the 2.5" disk drives. Most current 2.5" SFF hard drives have an ATA drive interface. This interface can be multiplexed together to produce a large ATA device. Similarly, a SCSI, FCAL, SAS, or PCI type bus could be designed on the PCB 130 to electrically connect the ATA drives together. In another embodiment, the 2.5" hard drives could be multiplexed together into a RAID array. This array or multiplexed hard drives could have a unique identification or logical unit number (LUN) in a larger storage system.

With the teachings of the present disclosure, a RAID array can be configured with a plurality of hard drives, in order to logically connect the drives together such that the host sees only one logical drive or LUN or any combination of drives. The RAID configuration allows for increased performance, reliability, and/or capacity that the user may desire.

As discussed above, a RAID architecture may be implemented on the PCB 130, in order to electrically and logically connect the hard drives. This provides a more efficient data transfer to the host system. In this way, the 2.5" hard disk drives can be combined in any single RAID architecture or combinations of RAID architectures. By way of illustration, the 2.5" hard drives can be combined into (1) a single RAID 0 stripe, (2) two mirrored RAID 1/0 configurations, or (3) a RAID 4 or 5 architecture with parity protection, for example.

Figure 4:
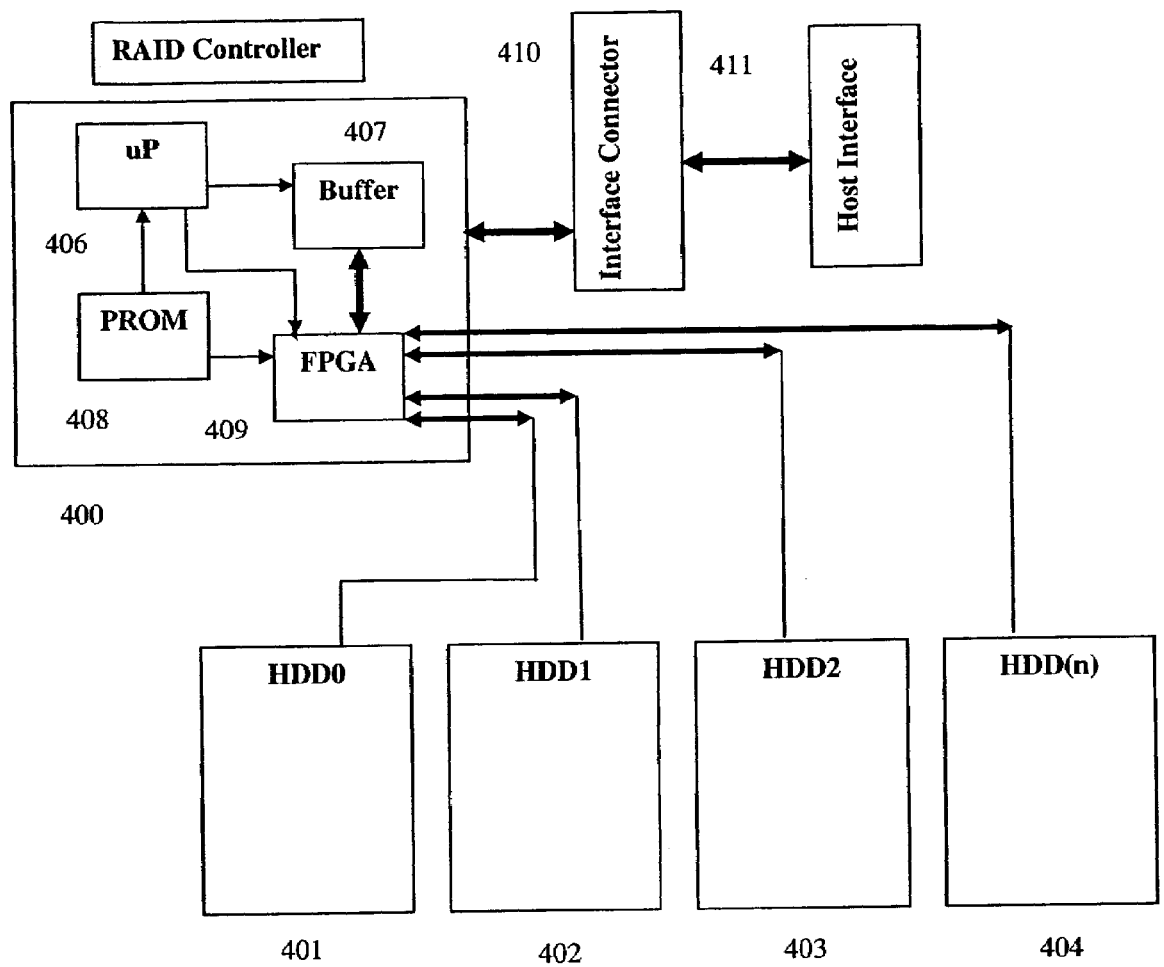
FIG. 4 illustrates one embodiment of electrically connecting the up to four hard drives together.

FIG. 4 shows a block diagram of a RAID controller 400, according to one embodiment of the present disclosure. This embodiment shows how to connect the plurality of storage devices into a RAID array, which may then be connected to a higher level or primary RAID architecture through a communication medium.

Referring to FIG. 4, the RAID controller 400 includes a central processing unit 406 (e.g., a microprocessor, microcontroller, ASIC, or the like), buffer RAM 407, read-only memory 408, and field programmable gate array or ASIC semiconductor device 409. The buffer RAM 407 may be used to sequence the data entering and exiting the RAID Controller 400. The read-only memory 408 may be programmable read only memory or other non-volatile memory that contains the instructions for how to handle the data being sequenced through the RAID Controller 400. The field programmable gate array (FPGA) 409 or ASIC that interfaces with a plurality of storage devices 401–404 contains the logic for how to break down and reassemble the data being written to and read from lower level devices. The FPGA may also include algorithms to perform parity calculations for use, for example, in RAID 4/5 applications, and assignment of identification to the storage devices and/or RAID controllers at the lower levels.

Data to be written to storage disks 401–404 would move from the host interface 411 (from the host), optionally through a primary RAID Controller (if present), through the Interface connector 410, and into the buffer RAM 407 of RAID Controller 400. Depending on the configuration setting as defined by, for example, the code in ROM 408, the RAID Controller would determine the RAID algorithm to use to distribute the data. In a RAID 5 configuration, for instance, the ROM would instruct the FPGA to disassemble the data into a RAID 0 stripe, and calculate parity for the data stripe, RAID 4/5. The data would then move through the RAM 407 and FPGA 409, where the stripe and parity is calculated and attached to the data, before being sent to the storage devices 401–404. In the case of reading from the storage devices, the process would operate in reverse. Given that the RAM 407, ROM 408, and FPGA 409 are manipulating the data to and from the storage devices, it would be possible to manage the data in any desired form required by/for the storage devices, RAID controller, and host bus adaptor, such as SCSI, ATA, FC, SATA, SAS or other command interfaces. For example, data may be transmitted between the RAID controllers and storage devices by means of an SCA or other type Interface Connector 410. It is to be appreciated that the calculations/operations of the FPGA can be done in software using a software algorithm (e.g., stored on ROM) executed by a processor such as CPU 406 or other dedicated processor.

In this embodiment, using the above components would allow for each RAID controller to appear to be one large volume or storage device. This would allow for the data system to address each component at each level as a distinct identification or LUN.

While certain exemplary embodiments have been described and shown in the accompanying drawings, it is to be understood that such embodiments are merely illustrative of and not restrictive on the broad invention, and that this invention not be specific constructions and arrangements shown and described, since modifications may occur to those ordinarily skilled in the art.

What is claimed is:

1. An apparatus, comprising:
a printed circuit board;
a plurality of storage devices each dimensioned of a first form factor;
a plurality of connectors coupled to the plurality of storage devices and said printed circuit board to electrically coupled said plurality of storage devices to said printed circuit board; and
a mounting apparatus mechanically coupled to the plurality of storage devices, said mounting apparatus dimensioned to a 3.5 inch form factor disk drive that is of a larger dimension than the first form factor.

2. The apparatus of claim 1 wherein said first form factor is a 2.5 inch form factor.

3. The apparatus of claim 1 further comprising a RAID controller mounted on said printed circuit board and electrically coupled to said plurality of storage devices.

4. The apparatus of claim 3 wherein said RAID controller is for coupling to a host to write data to and read data from said plurality of storage devices in accordance with a RAID type.

5. The apparatus of claim 4 wherein said RAID controller is for coupling to a primary RAID controller to write data to and read data from said plurality of storage devices in accordance with a RAID type.

6. The apparatus of claim 4 wherein said RAID type includes one or more of the following: RAID 0, RAID 1, RAID 2, RAID 3, RAID 4, and RAID 5.

7. The apparatus of claim 1 wherein said plurality of storage devices are configured as a RAID.

8. An apparatus, comprising:
a printed circuit board;
a plurality of 2.5 inch SFF disk drives;
a plurality of connectors coupled to the plurality of 2.5 inch SFF disk drives and said printed circuit board to electrically couple said plurality of 2.5 inch SFF disk drives to said printed circuit board; and
a mounting apparatus mechanically coupled to the plurality of 2.5 inch SFF disk drives, said mounting apparatus dimensioned to a SFF disk drive that is of a larger dimension than each of the 2.5 inch SFF disk drives.

9. The apparatus of claim 8 wherein said plurality of storage devices are configured as a RAID.

10. The apparatus of claim 8 wherein said SFF disk drive is a 3.5 inch SFF disk drive.

11. An apparatus, comprising:
a printed circuit board;
a plurality of disk drives coupled to said printed circuit board, each of said plurality of disk drives dimensioned to a first form factor; and
a mounting apparatus mechanically coupled to said plurality of disk drives, said mounting apparatus dimensioned to a 3.5 inch form factor disk drive that is of a larger dimension than the first form factor.

12. The apparatus of claim 11 wherein said first form factor is a 2.5 inch form factor.

13. The apparatus of claim 11 wherein said printed circuit board includes a RAID controller coupled to said plurality of disk drives.

14. The apparatus of claim 13 wherein said RAID controller is coupled to a host to write data to and read data from said plurality of disk drives in accordance with a RAID type.

15. The apparatus of claim 14 wherein said RAID type includes one or more of the following: RAID 0, RAID 1, RAID 2, RAID 3, RAID 4, and RAID 5.

16. The apparatus of claim 11 wherein said plurality of disk drives are configured as a RAID.

17. An apparatus, comprising:
a printed circuit board;
a plurality of 2.5 inch form factor disk drives coupled to said printed circuit board; and
a mounting apparatus mechanically coupled to said plurality of 2.5 inch form factor disk drives, said mounting apparatus dimensioned to a disk drive of a second form factor that is of a larger dimension than each of the 2.5 inch form factor disk drives.

18. The apparatus of claim 17 wherein said plurality of disk drives are configured as a RAID.

19. The apparatus of claim 17 wherein said second form factor is a 3.5 inch form factor.

* * * * *